United States Patent
McNutt et al.

(10) Patent No.: US 6,345,337 B1
(45) Date of Patent: Feb. 5, 2002

(54) METHOD AND SYSTEM FOR DETERMINING A CACHE SINGLE REFERENCE RESIDENCY TIME

(75) Inventors: Bruce McNutt, Gilroy; David Alastair Short, Laguna Hills; Brian Jay Smith, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/440,727

(22) Filed: Nov. 16, 1999

(51) Int. Cl.[7] .............................. G06F 12/12
(52) U.S. Cl. ................... 711/133; 711/118; 711/136; 711/170
(58) Field of Search .................. 711/133, 118, 711/136, 159, 170, 130

(56) References Cited

U.S. PATENT DOCUMENTS

| | | | |
|---|---|---|---|
| 4,920,478 A | * 4/1990 | Furuya et al. ............. | 364/200 |
| 5,452,440 A | 9/1995 | Salsburg ................... | 395/463 |
| 5,590,308 A | * 12/1996 | Shih ......................... | 711/136 |
| 5,606,688 A | 2/1997 | McNutt et al. ............ | 395/497.01 |
| 5,787,471 A | 7/1998 | Inoue et al. ............... | 711/133 |

OTHER PUBLICATIONS

IBM Technical Disclosure Bulletin, vol. 37, No. 06B, Jun. 1994, pp. 465–468, "Hit Ratio Estimates for Non–Cached Volumes".

* cited by examiner

Primary Examiner—Do Hyun Yoo
Assistant Examiner—Jasmine Song
(74) Attorney, Agent, or Firm—Ohlandt, Greeley, Ruggiero & Perle, LLP; Randall J. Bluestone

(57) ABSTRACT

A method for determining a single reference residency time of a cache comprises the steps of causing test data to be staged to the cache and measuring a response time after a wait time has elapsed. The measuring step is repeated for a plurality of values of wait time. The method also includes the step of determining a boundary value of the wait time. A wait time of less than or equal to the boundary value yields a corresponding response time representing a cache hit and a wait time of greater than the boundary value yields a corresponding response time representing a cache miss. The boundary value is an estimate of the single reference residency time of the cache.

18 Claims, 4 Drawing Sheets

METHOD AND SYSTEM FOR DETERMINING A CACHE SINGLE REFERENCE RESIDENCY TIME

FIELD OF THE INVENTION

The present invention relates to a computer memory cache and, more particularly, to determining a single reference residency time for data within the cache.

BACKGROUND OF THE INVENTION

Caching is a technique used to improve computer performance at all levels of the computer storage hierarchy. When a central processing unit (CPU) requests data for processing, the data is often moved from a slower, less costly memory to a high speed, more costly, memory that can be accessed directly by the CPU. The higher speed memory is generically referred to as a cache. In some data processing systems, the cache is housed within a cache control unit (CCU).

A typical caching algorithm permits data staged to the cache to remain in the cache for some indeterminate interval of time. If the CPU re-references the data while the data is still in the cache, then the caching algorithm allows the data to continue to remain in the cache. On the other hand, the caching algorithm will "age out" old data and overwrite the old data with new data if the old data is not timely re-referenced by the CPU.

Most cache management systems are based on a least recently used (LRU) algorithm. The LRU algorithm uses a stack of a limited size. A most recently used data request is placed on the top of the stack. Consequently, a least recently used data request is at the bottom of the stack. If a new request arrives when the stack is full, the least recently used request is removed from the bottom of the stack, and the new request is placed on the top of the stack.

The LRU caching algorithm is effective due to a characteristic of computer system operation called locality of reference. During any interval of time, data references are concentrated on a relatively small set of the elements assigned to the cache. Also, once a data element is referenced, the probability of it being re-referenced is highest soon after it is first referenced, with the probability of re-referencing diminishing as the time interval since the first reference increases.

A processor can access data from a cache in considerably less time than it can access data that is not in the cache. The satisfactory performance of the cache system depends, in part, on whether a desired item of data is in the cache at the time of re-referencing the data. Performance is therefore affected by the length of time for which the data is permitted to remain in the cache. When accessing data, if the data is in cache, the access is called a "cache it." If the data is not in cache, the access is called a "cache miss."

A single reference residency time (SRRT) of a storage subsystem cache is the length of time that passes between staging an item of data into the cache and aging it out, assuming that no reference to the data occurs after it is staged. The SRRT is an important indicator of cache performance. Generally, the longer the SRRT, i.e., the longer a unit of data remains in cache, the lesser the apparent demand on the cache. In contrast, a shorter SRRT indicates that the unit of data is overwritten sooner, and that the demand for cache resources is greater.

U.S. Pat. No. 5,452,440 to Salsburg, entitled "Method And Structure For Evaluating And Enhancing The Performance Of Cache Memory Systems" describes a method for determining which data should be placed into cache. However, the method does not determine the amount of time that the data remains in the cache.

U.S. Pat. No. 5,787,471 to Inoue et al., entitled "Cache Memory Management Apparatus Having A Replacement Method Based On The Total Data Retrieval Time And The Data Size" describes a cache memory management device. The device measures a time period required to obtain data from a database, and it also considers which data should be moved into the cache and which data should be removed from the cache. The device does not determine the amount of time that the data remains in the cache.

U.S. Pat. No. 5,606,688 to McNutt et al., entitled "Method And Apparatus For Dynamic Cache Memory Allocation Via Single-Reference Residency Times", describes a method for managing a cache that includes measuring SRRT. However, the method requires access to an LRU list from the CCU. Consequently, this method can be used only in a system in which the CCU provides access to the LRU list.

U.S. Pat. No. 5,590,308 to Shih, entitled "Method And Apparatus For Reducing False Invalidations In Distributed Systems" describes a method for managing an LRU stack. The method considers a data residency time, but the time is determined by, and obtained from within, a CCU. Consequently, this method can be used only in a system in which the CCU is capable of reporting the data residency time.

Another approach to determining SRRT is offered by the Astex software product, available from Computer Associates, Inc. of Islandia, N.Y. Astex uses an input/output disconnect time to determine whether a data access is a cache hit or a cache miss, and thereafter estimates SRRT. A disconnect time of 0 corresponds to a cache hit, and a disconnect time of greater than 0 indicates a cache miss. The disconnect time cannot readily be obtained in all systems, so consequently, this method is limited to use with systems that report the disconnect time.

Accordingly, it is an object of the present invention to provide a method of determining the SRRT of a cache without requiring access to any information maintained within the CCU.

It is a second object of the present invention to provide a method for determining the SRRT of a cache that can be used generically, that is, independent of the platform upon which the method is employed.

SUMMARY OF THE INVENTION

In accordance with the invention, a method is provided for determining a single reference residency time of a cache. The method comprises the steps of causing test data to be staged to the cache and measuring a response time after a wait time has elapsed. The measuring step is repeated for a plurality of values of wait time. The method also includes the step of determining a boundary value of the wait time. A wait time of less than or equal to the boundary value yields a corresponding response time representing a cache hit and a wait time of greater than the boundary value yields a corresponding response time representing a cache miss. The boundary value is an estimate of the single reference residency time of the cache.

DETAILED DESCRIPTION OF THE INVENTION

The present invention relates to a method and system for determining a single reference residency time for data within a cache memory. The invention utilizes the principle that the amount of time required to read data that is present in cache is significantly less than the amount of time required to read data that is not present in cache. This difference in time is due to the fact that a CPU reads data from cache at an electronic speed, while data that is not in cache is read from a storage subsystem, such as a hard drive, at a mechanical speed.

Figure 1:
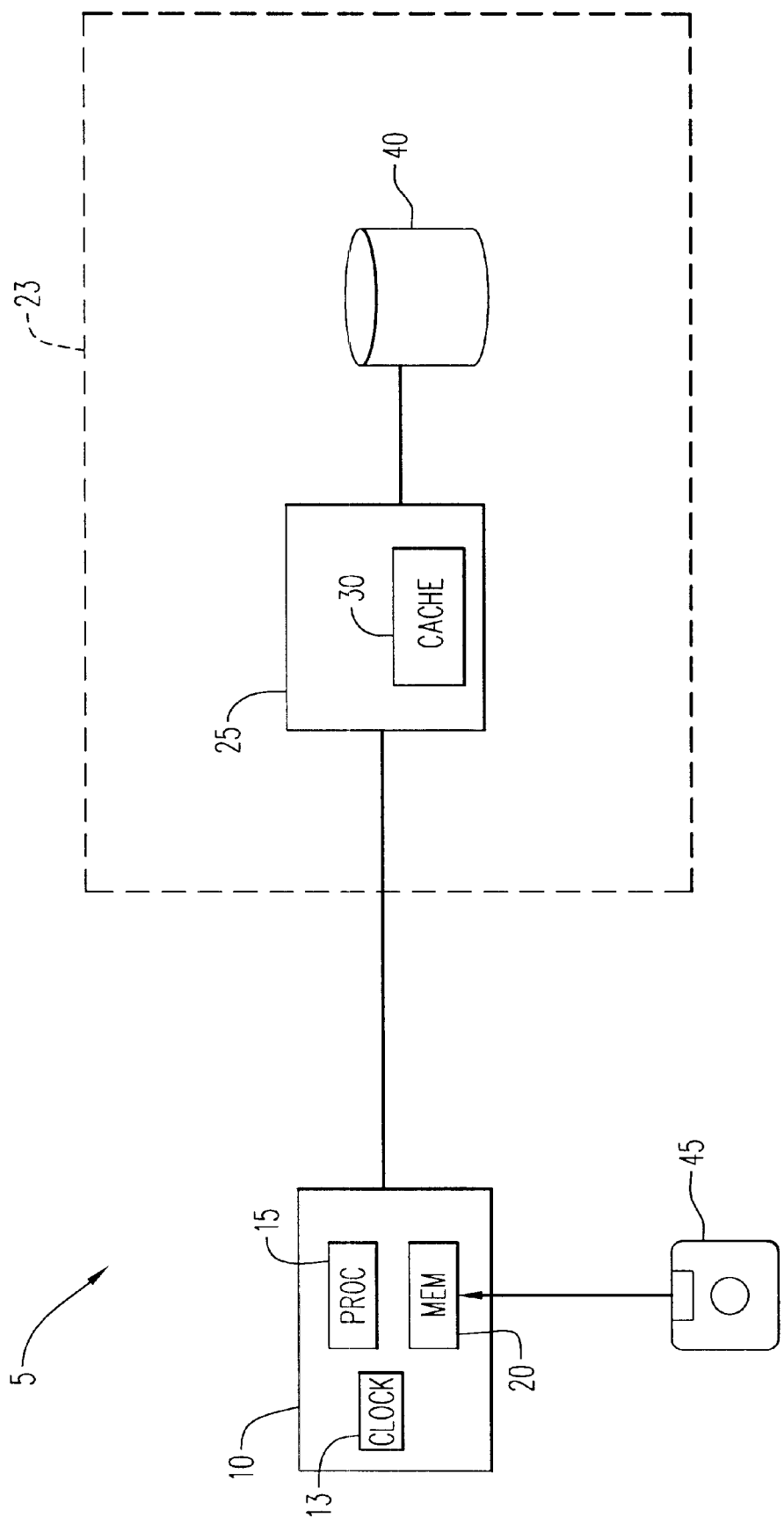
FIG. 1 is a block diagram of a computer system particularly suited for the present invention.

FIG. 1 is a block diagram of a computer system 5, particularly suited for the present invention. Computer system 5 includes a host computer 10, and a storage subsystem 23 that includes a CCU 25 and a disk drive 40. Host computer 10 has a clock 13 that indicates a current time, a processor 15 for the execution of program instructions and a memory 20 for the storage of the instructions and other data. CCU 25 includes a cache memory 30.

When processor 15, which may be implemented as one or more processors, desires data from disk drive 40 for the first time, it dispatches a request for the data to CCU 25. Upon receipt of the request, CCU 25 reads the data from disk drive 40 and sends the data to processor 15. CCU 25 also writes the data to cache 30.

Processor 15 may subsequently desire the same data. Again processor 15 dispatches a request for the data to CCU 25. If the data is still in cache 30, i.e., a cache hit, CCU 25 reads the data from cache 30. If the data is not in cache 30, i.e., a cache miss, CCU 25 must again read the data from disk drive 40. After obtaining the data, CCU 25 sends it to processor 15.

The SRRT is the length of time between staging data to cache 30 and aging out the data, assuming that there is no interim reference to the data. In accordance with the present invention, processor 15 executes a set of instructions to determine the SRRT.

Processor 15 dispatches a request for test data. This causes CCU 25 to read the test data from disk drive 40, and to write the test data to cache 30. After allowing a period of "wait time" to elapse, processor 15 makes a subsequent request for the same test data. Processor 15 measures the interval of time between dispatching the subsequent request and receiving the test data. This interval is called a "response time."

Two general cases are considered. In the first general case, the wait time is set to a relatively short interval of time such that a request is assured of resulting in a cache hit. Accordingly, the response time in this case serves as a reference time that represents a cache hit. In the second general case, the wait time is set to a longer interval than that used in the first general case. If a subsequent response time is significantly greater than the response time of the first general case, then the subsequent response time is indicative of a cache miss. If the subsequent response time is not significantly greater than that of the first general case, then the subsequent response time is indicative of a cache hit. The SRRT is the time boundary of the wait time that divides the response times into a group of cache hits and a group of cache misses.

To determine the SRRT, a series of tests is performed. Each test references a specific, corresponding item of cacheable data in the storage subsystem. A cacheable object is typically a "track", but the term "track" should be taken to refer to any unit of cacheable data, whether or not it consists of a physical track.

In broad terms, each test t includes the following operations:

1. Initialize: Request a track h(t) at a time s(t), where s(t) is a start time of test t. Track h(t) must be dedicated to test t, in the sense that no reference to h(t) can occur for an extended period of time before and after test t.
2. Wait: Wait until time s(t)+w(t), where a wait time w(t) is a delay within the anticipated range of a single reference residency time $\tau$. That is, $\tau(min)<=w(t)<=\tau(max)$.
3. Test Response: Request data from track h(t). Use host clock queries at the time of the request for data and at the time of its delivery to determine the input/output (I/O) response time r(t).

Figure 2:
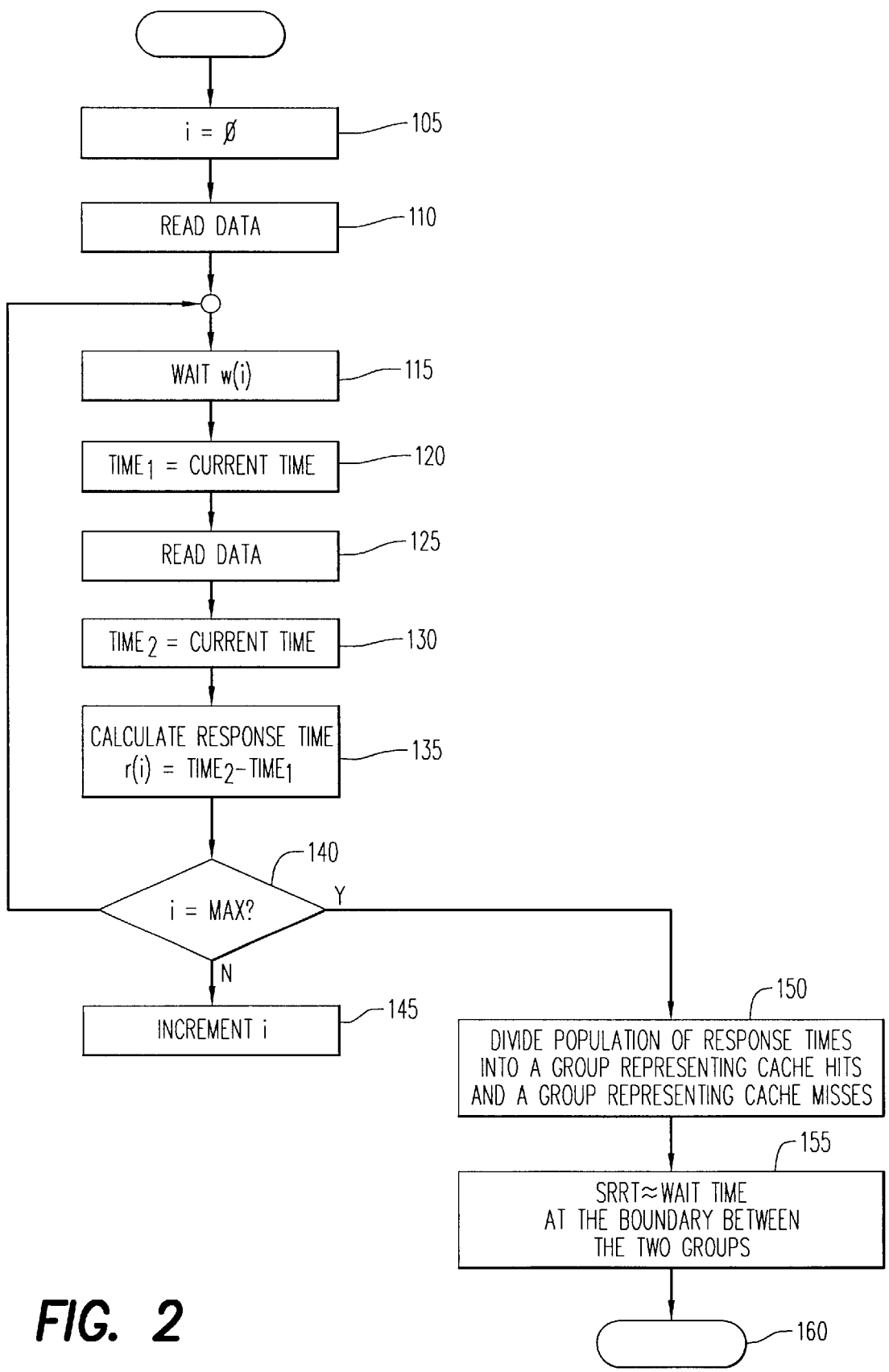
FIG. 2 is a flowchart of a method for determining a single reference residency time of a cache in accordance with the present invention.

FIG. 2 is a flowchart of a method for determining a single reference residency time of a cache in accordance with the present invention. While the procedures required to execute the invention hereof are indicated as already loaded into the memory 20 of host computer 10, they may be configured on a storage media, such as data memory 45 in FIG. 1, for subsequent loading into the host computer. The method begins with step 105.

In step 105, an index i is initialized. Here the index i is shown as being set to 0, and it will be subsequently incremented to a terminal value. However, the present invention does not require any particular implementation of loop control. The method then advances to step 110.

In step 110, processor 15 dispatches a first request for test data to CCU 25. CCU 25 causes the test data to staged from disk drive 40 to cache 30. This step ascertains a point in time at which the test data is staged into cache. The method then advances to step 115.

In step 115, processor 15 waits for a period of wait time w(i) to elapse. The duration of wait time w(i) is a function of the index i. In the preferred embodiment, wait time w(i) increases in duration as the index i increases. The greater the value of wait time w(i), the greater the likelihood that the test data will age out of cache 30. The method then advances to step 120.

In step 120, processor 15 reads a first current time $Time_1$ from clock 13. The method then advances to step 125.

In step 125, processor 15 dispatches a request for he test data and subsequently receives the test data from CCU 25. The method then advances to step 130

In step 130, processor 15 reads a second current time $Time_2$ from clock 13. The method then advances to step 135.

In step 135, processor 15 determines the response time r(i) that corresponds to wait time w(i). The response time r(i) is found from the difference between $Time_1$ and $Time_2$.

$$\text{response time } r(i) + Time_2 - Time_1$$

Note that in step 120 $Time_1$ is approximately the time at which processor 15 dispatches the request for the test data, and in step 130, $Time_2$ is approximately the time at which processor 15 receives the test data. Therefore, the response time r(i) is an interval of time between the dispatch of a request for the test data and a receipt of the test data by the requester. The determination of response time r(i) can be refined by accounting for time to execute instructions associated with steps 120 and 130. The method then advances to step 140.

In step 140, the index i is compared to a terminal value max. If index i is not equal to the terminal value max, then the method advances to step 145. If index i is equal to the terminal value max, then the method branches to step 150.

In step 145, index i is incremented. The method then loops back to step 115. Steps 115–140 are executed using a different, preferably increased, value of wait time w(i), and processor 15 determines a new corresponding response time r(i). In the preferred embodiment, this loop is executed for a plurality of values of wait time w(i) that span a range from a minimum anticipated SRRT to a maximum anticipated SRRT. The loop yields a population of response times r(i).

In step 150, the population of response times r(i) is evaluated and divided into two groups. One group contains response times r(i) that represent cache hits, the other group contains response times r(i) that represent cache misses. A suggested method for implementing this step is presented in FIG. 3, which is described below. The method then advances to step 155.

In step 155, processor 15 determines a boundary value of wait time w(i) that yields the division of the response times into the two groups in step 150. That is, a wait time w(i) that bears a predetermined relationship to the boundary value yields a corresponding response time r(i) that can be categorized as either a cache hit or a cache miss. In the preferred embodiment, a wait time w(i) that is less than or equal to the boundary value yields a corresponding response time r(i) representing a cache hit, and a wait time w(i) that is greater than the boundary value yields a corresponding response time r(i) representing a cache miss. The boundary value is an estimate of the single reference residency time of the cache. The method then advances to step 160.

In step 160, the method ends.

The sequence of steps shown in FIG. 2 can be altered without departing from the present invention. For example, a second processing loop including steps 115–135 can be executed in order to obtain a number of response times r(i) for each wait time w(i). This would allow for a more statistically accurate value for each r(i). Also, the activities in steps 150 and 155 can be performed as each response time r(i) is determined, rather than waiting for the accumulation of a complete population of response times r(i).

The amount of data that is read, and the sequence of waiting times is not absolutely fixed. A user of computer system 5 has some control over these parameters, but defaults are chosen if they are not specified by the user. More particularly, the user specifies:

1. a smallest value to use for the wait time w(i);
2. a gap between successive wait times;
3. a number of reads to do for each wait time w(i); and
4. whether to execute the method continuously as a monitor or just one time.

Figure 3:
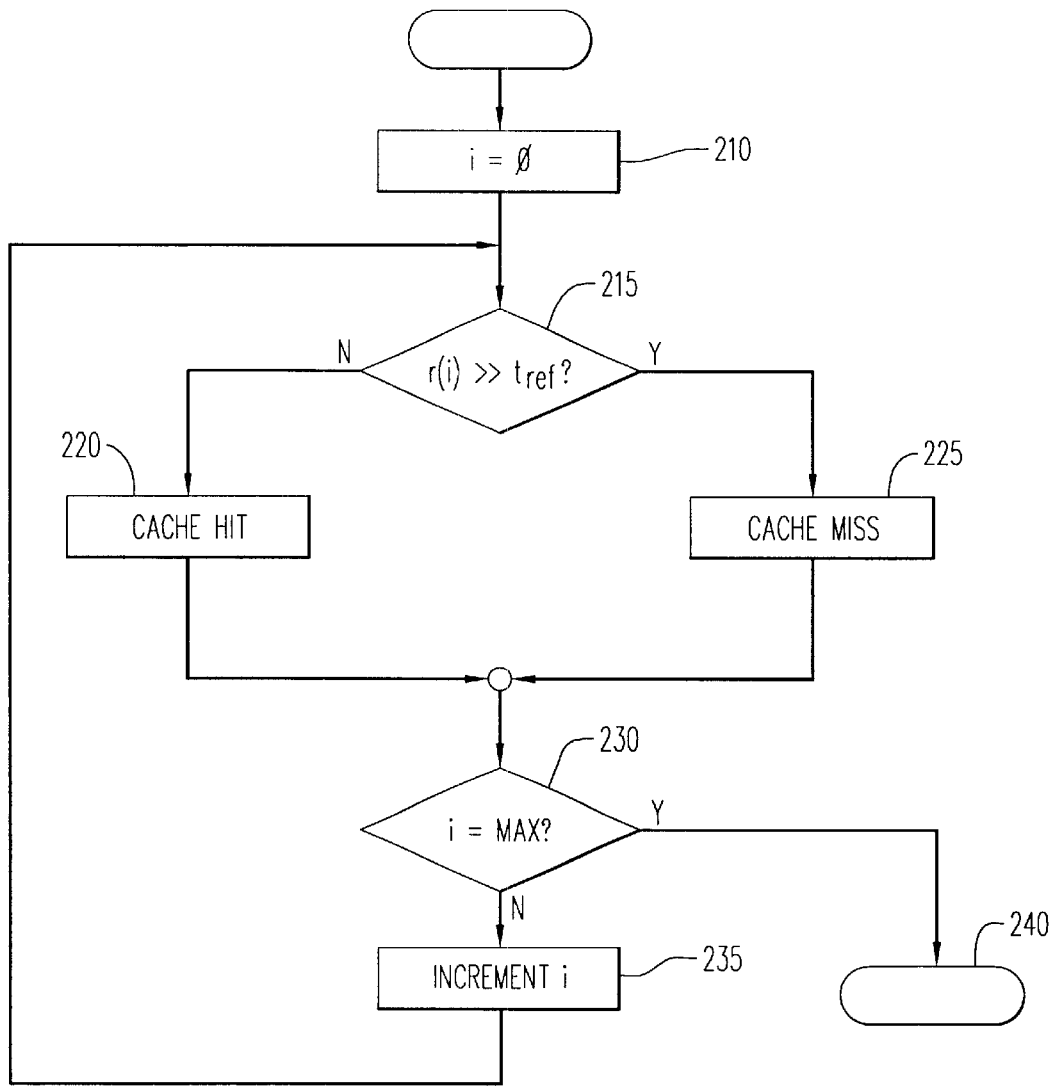
FIG. 3 is a flowchart of a method for dividing a population of response times into two groups.

FIG. 3 is a flowchart of a method for dividing the population of response times r(i) into two groups as described above in FIG. 2, step 150. As also described above, one group contains response times r(i) that represent cache hits, the other group contains response times r(i) that represent cache misses. The method begins with step 210.

In step 210, an index i is initialized. Here the index i is shown as being set to 0, and it will be subsequently incremented to a terminal value. However, the present invention does not require any particular implementation of loop control. The method then advances to step 215.

In step 215, a response time r(i) is compared with a reference time $t_{ref}$ that is representative of a cache hit. A method for measuring reference time $t_{ref}$ is presented in FIG. 4, which is described below. The response time r(i) will be categorized as either a cache hit or a cache miss based on its relationship to $t_{ref}$. If response time r(i) is not significantly greater than reference time $t_{ref}$, then the method branches to step 220. If response time r(i) is significantly greater than reference time $t_{ref}$, then the method branches to step 225.

In step 220, the response time r(i) is assigned to he group representing cache hits. The method then advances to step 230.

In step 225, the response time r(i) is assigned to he group representing cache misses. The method then advances to step 230.

In step 230, the index i is compared to a terminal value max, If index i is not equal to the terminal value max, then the method advances to step 235. If index i is equal to the terminal value max, then the method branches to step 240.

In step 235, the index i is incremented. The method then loops back to step 215 to process the next response time r(i).

In step 240, the method ends.

Figure 4:
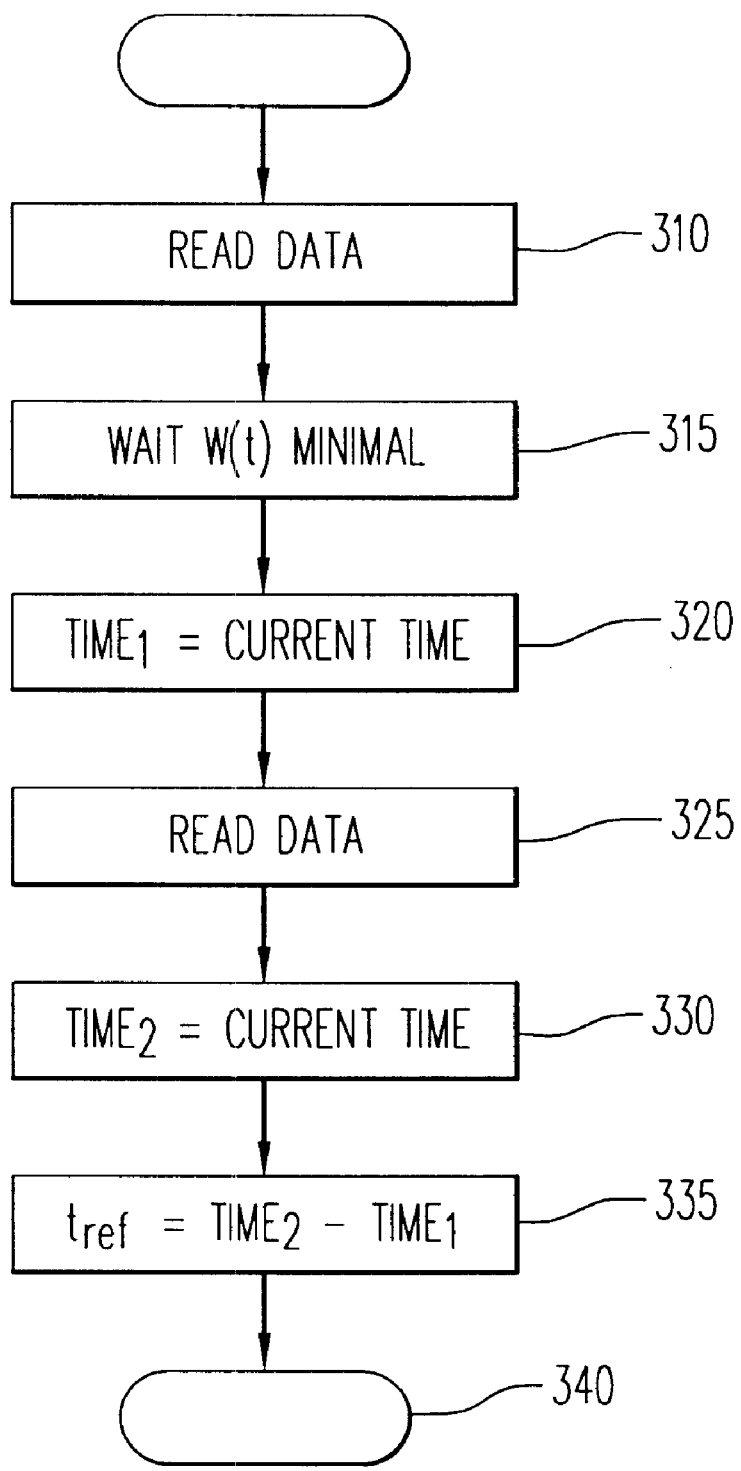
FIG. 4 is a flowchart of a method for measuring a reference time that is representative of a cache hit.

FIG. 4 is a flowchart of a method for measuring the reference time $t_{ref}$ that is representative of a cache hit. The application of reference time $t_{ref}$ is shown above in FIG. 3, step 215. The method begins with step 310.

In step 310, processor 15 dispatches a first request for reference data to CCU 25. CCU 25 causes the reference data to be staged from disk drive 40 to cache 30. This step ascertains a point in time at which the reference data is staged into cache. The method then advances to step 315.

In step 315, processor 15 waits for a minimal period of wait time w(t) to elapse. This wait time w(t) can be as short as 0 seconds, or it can be some other relatively short period of time. The intent is to ensure that the reference data is still in cache at the time of a subsequent request for the reference data, as described below. The method then advances to step 320.

In step 320, processor 15 reads a first current time $Time_1$ from clock 13. The method then advances to step 325.

In step 325, processor 15 dispatches a request for the reference data and subsequently receives the reference data from CCU 25. The method then advances to step 330.

In step 330, processor 15 reads a second current time $Time_2$ from clock 13. The method then advances to step 335.

In step 335, reference time $t_{ref}$ is found from the difference between $Time_1$ and $Time_2$.

$$\text{reference time } t_{ref} = Time_2 - Time_1$$

Note that steps 310 and 315 ensure that the reference data is initially staged into cache. Note also that in step 320 $Time_1$ is approximately the time at which processor 15 dispatches the request for the reference data, and in step 330, $Time_2$ is approximately the time at which processor 15 receives the reference data. Therefore, the reference time $t_{ref}$ is an interval of time between the dispatch of a request for reference data and a receipt of the reference data where the reference data is known to be in the cache at the time of the dispatch of the request. The determination of reference time $t_{ref}$ can be refined by accounting for time required to execute instructions associated with steps 320 and 330. The method then advances to step 340.

In step 340, the method ends.

In general, the tests described above may be executed indefinitely if continuous monitoring of the SRRT is desired. However, at any given time, the results of some number n of the most recent tests can be examined. For example, let the tests t be numbered backwards, starting from the current time. Thus, test t=0 completed most recently; test t=−1 had completed most recently prior to the completion of test t=0, and so forth.

The response times $r(-i)$, for $i=0,1,\ldots,n-1$, should divide into two populations:

(A) those with wait times shorter than $\tau$, corresponding to cache hits, and (B) those with wait times longer than $\tau$, corresponding to cache misses.

Each population should exhibit a characteristic pattern of I/O response times distinct from the other. Moreover, the expected behavior of the response time depends only upon the population to which a given test belongs. Although the wait time determines whether an I/O is a hit or miss, variations in the wait time should have no systematic effect within either population taken separately.

$\tau$ can be estimated by finding the quantity $\tau^*$ which most clearly divides pairs of test results $(w(-i), r(-i))$, $i=0,1,\ldots, n-1$, into distinct populations A and B. More specifically, population A is assigned to contain all test results with $w(-i)>\tau^*$, while population B is assigned all test results with $w(-i)<=\tau^*$. The value $\tau^*$ is chosen so as to maximize the observed difference between the two populations.

A variety of techniques of statistical analysis can be used to divide the test results as just described. The scope of the invention is intended to include all such techniques. The following two techniques are given as examples:

1. Perform a series of m tests for each of a sequence of increasing wait times $W(j)$, $j=1,2,\ldots,l$. Thus, $n=lm$. Determine the median $q(j)$ of the response times corresponding to each distinct wait time $W(j)$. Choose $\tau^*$ as $(W(k)+W(k+1))/2$, where $W(k)$ is the first wait time such that $q(k+1)>=q(k)+\Delta$. Here $\Delta$ is chosen heuristically, and reflects the time added to I/O service when a cache miss causes physical disk motion.

2. Arrange the tests so that occasional tests are run for every wait time $\tau(min)<=W<=\tau(max)$, in increments of one second, but such tests are frequent for values W close to the most recent estimates of $\tau^*$ and relatively rare for values far from the most recent estimates. After any given test $t=0$, estimate $\tau^*$ by examining the two sets:

$\{A\}=\{r(-i)|W(-i)<=\tau^*, i=0,1,\ldots, n-1\}$ $\{B\}=\{r(-i)|W(-i)>\tau^*, i=0,1,\ldots, n-1\}$ Select the value $\tau^*$ such that the sum of the total squared deviation from its mean, for the set A, plus the total squared deviation from its mean, for the set B, is minimized.

The present invention offers many advantages over prior art systems. Several of these advantages are described below.

System administrators, and others, can use the present invention to fine-tune their system, because the SRRT provides a direct method by which to gauge whether the cache size is adequate for current load conditions. For this reason, the SRRT is an important indicator of overall storage subsystem health. Developers of cache control algorithms can also use the present invention to fine-tune their cache algorithms.

The value for SRRT is determined promptly, often in "real-time." That is to say, the time to compute the SRRT is only slightly greater than the actual SRRT.

The general technique employed in the present invention is independent of both the host computer and the storage subsystem. No platform-specific assumptions are made about an interface between the host computer and the storage subsystem. For example, the present invention does not require the interface to support an enterprise system connection (ESCON) measurement such as disconnect time. The present invention can be applied, on virtually any host platform, without requiring subsystem instrumentation.

The SRRT is a more precise metric of cache performance behavior than the prior art metrics such as hit ratios and miss ratios.

The measurement of SRRT is more precise than estimating the cache residency time by using Little's Law. There are various reasons for this. For example:

1. The effective size of a cache may be considerably less than the actual size of the cache because the cache holds the disk subsystem microcode.

2. The amount of cache required to store some particular data might be considerably greater than expected because of the need to store metadata associated with the data.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for determining a single reference residency time of a cache, comprising:

causing test data to be staged to said cache;

measuring a response time after a wait time has elapsed, said response time being an interval of time between a dispatch of a request for said test data and a receipt of said test data;

repeating said measuring step using a plurality of values of said wait time; and determining a boundary value of said wait time, wherein said plurality of values of said wait time that bear a predetermined relationship to said boundary value yield corresponding response times that represent cache hits.

2. The method of claim 1, wherein said determining step includes categorizing said response time as a cache hit when said response time bears a predetermined relationship to a reference time.

3. The method of claim 2, wherein said reference time is an interval of time between a time of dispatch of a request for reference data and a time of receipt of said reference data, wherein said reference data is in said cache at said time of dispatch of said request for said reference data.

4. The method of claim 1, wherein said plurality of values of wait time span a range from a minimum anticipated single reference residency time to a maximum anticipated single reference residency time.

5. The method of claim 1, wherein said determining step includes partitioning a plurality of response times into two populations, and wherein said boundary value of said wait time maximizes a difference of said plurality of response times between said two populations.

6. The method of claim 1, wherein said determining step includes statistically analyzing a plurality of response times to partition said plurality of response times into a group of cache hits and a group of cache misses.

7. A system for determining a single reference residency time of a cache, comprising:

means for causing test data to be staged to said cache;

means for measuring a response time after a wait time has elapsed, said response time being an interval of time between a dispatch of a request for said test data and a receipt of said test data;

means for repeating said measuring using a plurality of values of said wait time; and means for determining a boundary value of said wait time, wherein said plurality of values of said wait time that bear a predetermined relationship to said boundary value yield corresponding response times that represent cache hits.

8. The system of claim 7, further comprising:

means for categorizing said response time as a cache hit when said response time bears a predetermined relationship to a reference time.

9. The system of claim 8, wherein said reference time is an interval of time between a time of dispatch of a request for reference data and a time of receipt of said reference data, wherein said reference data is in said cache at said time of dispatch of said request for said reference data.

10. The system of claim 7, wherein said plurality of values of wait time span a range from a minimum anticipated single reference residency time to a maximum anticipated single reference residency time.

11. The system of claim 7, further comprising:

means for partitioning a plurality of response times into two populations, wherein said boundary value of said wait time maximizes a difference of said plurality of response times between said two populations.

12. The system of claim 7, further comprising means for statistically analyzing a plurality of response times to partition said plurality of response times into a group of cache hits and a group of cache misses.

13. A storage media including instructions for controlling a processor to determine a single reference residency time of a cache, comprising:

(a) means for controlling said processor to cause test data to be staged to said cache;

(b) means for controlling said processor to measure a response time after a wait time has elapsed, said response time being an interval of time between a dispatch of a request for said test data and a receipt of said test data;

(c) means for controlling said processor to cause means (a) and (b) to repeat their respective actions using a plurality of values of said wait time; and (d) means for controlling said processor to determine a boundary value of said wait time, wherein said plurality of values of said wait time that bear a predetermined relationship to s aid boundary value yield corresponding response times that represent cache hits.

14. The storage media of claim 13, further comprising means for controlling said processor to categorize said response time as a cache hit when said response time bears a predetermined relationship to a reference time.

15. The storage media of claim 14, wherein said reference time is an interval of time between a time of dispatch of a request for reference data and a time of receipt of said reference data, wherein said reference data is in said cache at said time of dispatch of said request for said reference data.

16. The storage media of claim 13, wherein said plurality of values of wait time span a range from a minimum anticipated single reference residency time to a maximum anticipated single reference residency time.

17. The storage media of claim 13, further comprising means for controlling said processor to partition a plurality of response times into two populations, wherein said boundary value of said wait time maximizes a difference of said plurality of response times between said two populations.

18. The storage media of claim 13, further comprising means for controlling said processor to statistically analyze a plurality of response times to partition said plurality of response times into a group of cache hits and a group of cache misses.

* * * * *